United States Patent
Eddaoudi et al.

(10) Patent No.: US 12,017,186 B2
(45) Date of Patent: Jun. 25, 2024

(54) USE OF POLYVINYLPYRROLIDONE IN THE PREPARATION OF ana-ZMOF THIN FILM MEMBRANES FOR SEPARATION PROCESSES

(71) Applicant: King Abdullah University of Science and Technology, Thuwal (SA)

(72) Inventors: Mohamed Eddaoudi, Thuwal (SA); Valeriya Chernikova, Thuwal (SA); Osama Shekhah, Thuwal (SA); Youssef Belmabkhout, Thuwal (SA)

(73) Assignee: King Abdullah University of Science & Technology, Thuwal (SA)

( * ) Notice: Subject to any disclaimer, the term of this patent is extended or adjusted under 35 U.S.C. 154(b) by 290 days.

(21) Appl. No.: 17/281,438

(22) PCT Filed: Sep. 30, 2019

(86) PCT No.: PCT/IB2019/058297
§ 371 (c)(1),
(2) Date: Mar. 30, 2021

(87) PCT Pub. No.: WO2020/070622
PCT Pub. Date: Apr. 9, 2020

(65) Prior Publication Data
US 2021/0394126 A1    Dec. 23, 2021

Related U.S. Application Data

(60) Provisional application No. 62/905,976, filed on Sep. 25, 2019, provisional application No. 62/739,423, filed on Oct. 1, 2018.

(51) Int. Cl.
*B01D 69/12*    (2006.01)
*B01D 53/22*    (2006.01)
(Continued)

(52) U.S. Cl.
CPC ........... *B01D 69/12* (2013.01); *B01D 53/228* (2013.01); *B01D 67/0051* (2013.01);
(Continued)

(58) Field of Classification Search
None
See application file for complete search history.

(56) References Cited

U.S. PATENT DOCUMENTS 7,033,968 B1 * 4/2006 Bons ............... B01D 67/0051
502/4
2016/0296883 A1 * 10/2016 Eddaoudi ......... B01D 67/0051

FOREIGN PATENT DOCUMENTS

WO    2017064648 A1    4/2017
WO    WO-2017064648 A1 *    4/2017 ........... B01J 20/226

OTHER PUBLICATIONS

Pimentel, Brian R., "Zeolitic Imidazolate Frameworks: Next-Generation Materials for Energy-Efficient Gas Separations", Chemsuschem, 7, 2014, pp. 3202-3240. (Year: 2014).*
(Continued)

*Primary Examiner* — Jason M Greene
(74) *Attorney, Agent, or Firm* — Billion & Armitage

(57) ABSTRACT

Embodiments include methods of fabricating a zeolite-like metal-organic framework with an ana-topology (ana-ZMOF) thin film membrane, the methods comprising: (1) modifying a substrate with ana-ZMOF crystal precursors in the presence of polyvinylpyrrolidone; and (2) intergrowing the ana-ZMOF crystal precursors in the presence of polyvinylpyrrolidone to form a continuous defect-free thin film of an ana-ZMOF intergrown on the substrate. Embodiments further include methods of separating chemical species comprising contacting an ana-ZMOF thin film membrane with a fluid composition containing one or more chemical species and separating at least one of the chemical species.

19 Claims, 8 Drawing Sheets

(51) Int. Cl.
B01D 67/00 (2006.01)
B01D 71/02 (2006.01)

(52) U.S. Cl.
CPC ....... *B01D 67/0076* (2013.01); *B01D 71/028* (2013.01); *B01D 2256/16* (2013.01); *B01D 2256/24* (2013.01); *B01D 2257/504* (2013.01); *B01D 2257/7022* (2013.01); *B01D 2323/22* (2013.01); *B01D 2323/36* (2013.01); *B01D 2325/02* (2013.01); *B01D 2325/04* (2013.01); *B01D 2325/06* (2013.01); *B01D 2325/20* (2013.01)

(56) References Cited

OTHER PUBLICATIONS

Chen, Binling, "Zeolitic imidazolate framework materials: recent progress in synthesis and applications", Journal of Materials Chemistry A, 2, 214, pp. 16811-16831. (Year: 2014).*
Notification of Transmittal of the International Search Report and the Written Opinion of the International Searching Authority, or the Declaration for PCT Application No. PCT/IB2019/058297 dated Dec. 3, 2019.
Bradshaw, et al., "Metal-organic framework growth at functional interfaces: thin films and composites for diverse applications", Chemical Society Reviews, vol. 41, No. 6,, Jan. 1, 2012, 2344-2381.
Chen, et al., "Zeolitic imidazolate framework materials: recent progress in synthesis and applications", vol. 2, No. 40, Jul. 17, 2014, 16811-16831.
Pimentel, et al., "Zeolitic Imidazolatge Frameworks: Next-Generation Mateirals for Energy-Efficient Gas Separations", Chemsuschem, vol. 7, No. 12, Dec. 31, 2014, 3202-3240.
Shah, et al., "Current Status of Metal-Organic Framework Membranes for Gas Separations: Promises and Challenges", Ind. & Eng. Chem. Res. 2012, 51, 2179-2199, Feb. 8, 2012, 2179-2199.
Adil, et al., "Gas/vapour separation using ultra-microporous metal-organic frameworks: insights into the structure/ separation relationship", Chem. Soc. Rev., 46, 3402, Feb. 28, 2017.
Al-Maythalony, et al., "Quest for Anionic MOF Membranes: Continuous sod-ZMOF Membrane with CO2 Adsorption-Driven Selectivity", J. Am. Chem. Soc., 137, 1754-1757, Jan. 12, 2015.
Eum, et al., "Zeolitic Imidazolate Framework Membranes Supported on Macroporous Carbon Hollow Fibers by Fluidic Processing Techniques", Adv. Mater. Interfaces 2017, 4, 1700080, Apr. 20, 2017.
Fu, et al., "Fabrication of COF-MOF Composite Membranes and Their Highly Selective Separation of H2/CO2", J. Am. Chem. Soc. 138, 7673-7680, May 26, 2016.
Jeon, et al., "Ultra-selective high-flux membranes from directly synthesized zeolite nanosheets", Springer Nature, vol. 543, Mar. 30, 2017.
Li, et al., "Recent developments in membranes for efficient hydrogen purification", Journal of MembraneScience 495, 130-168, Apr. 9, 2015.
Liu, et al., "Butane isomer transport properties of 6FDA-DAM and MFI-6FDA-DAM mixed matrix membranes", Journal of Membrane Science 343, 157-163, Jul. 21, 2009.
Rangnekar, et al., "Zeolite membranes—a review and comparison with MOFs", Chem. Soc. Rev., 44, 7128, Apr. 7, 2015.
Takamizawa, et al., "Single-Crystal Membrane for Anisotropic and Efficient Gas Permeation", J. Am. Chem. Soc., 132, 2862-2863, Dec. 12, 2009.
Eddaoudi, Mohamed, et al., "Zeolite-Like Metal-Organic Frameworks (ZMOFs): Design, Synthesis, and Properties", Chem. Soc. Rev., vol. 44, Oct. 24, 2014, 228-249.
"Communication pursuant to Article 94(3) EPC Received dated May 15, 2023", for EP Application No. 19782746.2, 5 Pages.
"First Examination Report Received dated May 9, 2023", for SA Application No. 521421630, 9 Pages.
Bux, et al., "Zeolitic Imidazolate Framework Membrane with Molecular Sieving Properties by Microwave-Assisted Solvothermal Synthesis", J. Am. Chem. Soc. 2009, 131, 16000-16001.

* cited by examiner

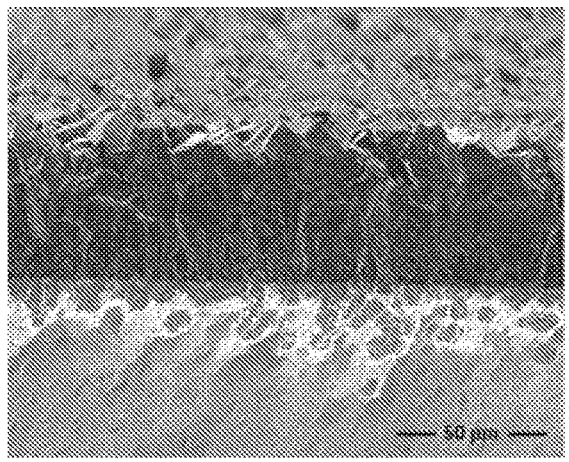 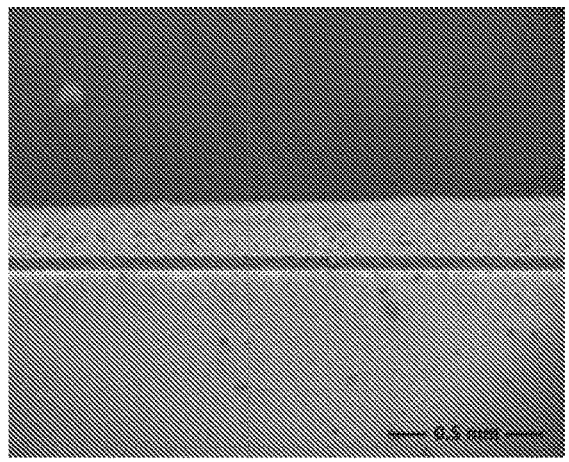
FIG. 7A          FIG. 7B

USE OF POLYVINYLPYRROLIDONE IN THE PREPARATION OF ana-ZMOF THIN FILM MEMBRANES FOR SEPARATION PROCESSES

BACKGROUND

Natural gas reforming remains the global method of choice for hydrogen production, with no significant changes expected in the near future. In hydrogen production processes, syngas, which is typically formed as an intermediate step, reacts with water vapors via the water gas shift reaction to produce "raw" hydrogen (60-80% $H_2$, 20-40% $CO_2$, and small amounts of impurities). It is difficult for the "raw" $H_2$ product to meet the demands for high purity (e.g., for fuel cell technology which demands purity levels of 99.9%)). Accordingly, hydrogen purification is essential for obtaining high quality hydrogen fuel.

Membrane technology exhibits inherent advantages over existing separation technologies. Among different type of membranes, reverse selective or "$CO_2$ selective" membranes, in which larger gas ($CO_2$) permeates faster than smaller gas ($H_2$), are more desirable for obtaining fuel cell quality hydrogen, since these membranes can more easily meet requirements for high purity as compared to $H_2$-selective membranes. While strong progress has been made in $H_2$-selective MOF membranes, reports of $CO_2$-selective membranes are scarce. To the best of Applicant's knowledge, only two MOFs have been reported for potential use in hydrogen purification via membrane separation: a single crystal $[Cu_2(bza)_4(pyz)]_n$ membrane and a zeolite-like MOF membrane, anionic sod-ZMOF, which was developed by Applicant and exhibited preferential permeation of $CO_2$ over $H_2$ in a mixture. However, reported performances of MOF membranes remain lower than the performance of benchmark materials. Thus, MOFs are not considered to be potential materials for $CO_2/H_2$ separation applications.

Conventional separation of butane isomers via cryogenic distillation is environmentally damaging and energy intensive. Membrane-based separation, in turn, is an order of magnitude more energy efficient. However, for now, such separation is challenging and cannot meet requirements for practical applications due to limitations in material performance and material integration Mainly two classes of materials have been studied for such applications: polymers and zeolites. Rubbery polymers have generally low selectivity and high butane and isobutane permeability due to the high solubility of this molecules. The solubility, however, decreases as the polymer is plasticized, making them economically unattractive. Glassy polymers similarly are not applicable due to low butane permeability. While well-defined structure of zeolites offer control over diffusion and sorption of isobutane isomers, processability of zeolites as membranes remains an issue. Similarly to zeolites, MOF has a great potential to be used as a membranes for butane isomer separation. However, only ZIF-90 pure membrane has been reported in the literature for this application.

SUMMARY

Methods of fabricating thin film membranes based on zeolite-like metal-organic frameworks with an ana topology (ana-ZMOF), methods of separating chemical species from fluid compositions using said membranes, and the like are disclosed herein. It has been discovered that, through the addition of polyvinylpyrrolidone to the reaction mixture, the challenges associated with pure crystal intergrowth can be overcome and zeolite-like metal-organic frameworks with an ana topology can be formed as continuous defect-free thin film membranes. The fabrication methods include a two-step procedure, the steps involving (1) in-situ modification of a support with ana-ZMOF crystal precursors and (2) subsequent crystal intergrowth to form a continuous defect-free ana-ZMOF thin film intergrown on the modified support. The resulting membranes have unique intrinsic properties suitable for use in a wide variety of separation processes, including, but not limited to, those involving carbon dioxide and hydrogen, butane isomers separation, and the like.

Accordingly, embodiments of the present disclosure describe methods of fabricating an ana-ZMOF thin film membrane comprising (1) modifying a substrate with ana-ZMOF crystal precursors in the presence of polyvinylpyrrolidone, and (2) intergrowing the ana-ZMOF crystal precursors in the presence of polyvinylpyrrolidone to form a continuous defect-free ana-ZMOF thin film intergrown on the substrate.

In certain embodiments, the method of fabricating a membrane with a thin film of a zeolite-like metal-organic framework with an ana topology can comprise one or more of the following steps: adding polyvinylpyrrolidone to a solution containing ana-ZMOF precursors and optionally one or more solvents to prepare a first precursor solution; immersing a substrate in the first precursor solution and heating the first precursor solution while the substrate is immersed therein to a first temperature to obtain a modified substrate; optionally drying the modified substrate; adding polyvinylpyrrolidone to a solution containing ana-ZMOF precursors and optionally one or more solvents to prepare a second precursor solution; immersing the dried modified substrate in the second precursor solution and heating the second precursor solution while the dried modified substrate is immersed therein to a second temperature to form an ana-ZMOF thin film membrane.

In an embodiment, the first precursor solution is sonicated prior to immersing the substrate in the first precursor solution. In an embodiment, the second precursor solution is sonicated and heated prior to immersing the dried modified substrate in the second precursor solution. In an embodiment, the ana-ZMOF precursors and one or more solvents are the same in the first precursor solution and the second precursor solution. In an embodiment, a concentration of each of the ana-ZMOF precursors in the first solution is less than their concentration in the second solution. In an embodiment, the ana-ZMOF precursors include a rare earth metal precursor, a ligand precursor, and an alkali metal precursor or an alkaline metal precursor. In an embodiment, the rare-earth metal precursors include a rare earth element selected form the group consisting of cerium, dysprosium, erbium, europium, gadolinium, holmium, lanthanum, lutetium, neodymium, praseodymium, promethium, samarium, scandium, terbium, thulium, ytterbium, yttrium, and any combination thereof. In an embodiment, the ligand precursor is selected from the group consisting of 4,5-imidazole dicarboxylic acid (ImDC); 1H-Imidazole-2-carboxylic acid; 2,7-diaza-antracene-1,8-dicarboxylic acid; pyrimidine-4,6-dicarboxcylic acid; pyridine-2,5-dicarboxylic acid; 2,7-diaza-anthracene-3,6-dicarboxylic acid; benzene-1,2,4,5,tetracarboxylic acid; naphthalene-2,3,6,7-tetracarboxylic acid; anthracene-2,3,6,7-tetracarboxylic acid; and any combination thereof. In an embodiment, the alkali metal precursor includes an alkali metal selected from the group consisting of lithium, sodium, potassium, rubidium, cesium, francium, and any combination thereof. In an embodiment, the alkaline metal precursor includes an alkaline metal selected from the group consisting of beryllium, magnesium, calcium, strontium, barium, radium, and any combination thereof. In an embodiment, the one or more solvents are selected form the group consisting of water; N,N-dimethyl formamide (DMF); ethanol; 4,4;-trimethylene-dipiperidine; 1,2-diaminocyclohexane; and any combination thereof. In an embodiment, the modified substrate is a substrate that has been modified with ana-ZMOF crystal precursors. In an embodiment, the second temperature is less than the first temperature. In an embodiment, the continuous ana-ZMOF thin film membrane comprises a continuous thin film of ana-ZMOF inter-grown on the modified substrate. In an embodiment, the method further comprises activating the ana-ZMOF thin film membrane by exchanging solvent present in the ana-ZMOF thin film membrane with another solvent and/or subjecting the ana-ZMOF thin film membrane to a vacuum to activate the ana-ZMOF thin film membrane.

Embodiments of the present disclosure also describe a membrane comprising a thin film of a continuous zeolite-like metal-organic framework having an ana topology (ana-ZMOF) intergrown on a modified substrate, wherein the ana-ZMOF thin film membrane has a pore window size of about 4.1 Å and exhibits a selectivity for $CO_2$ over $H_2$ and/or n-butane over iso-butane.

Embodiments of the present disclosure further describe a method of separating chemical species comprising contacting an ana-ZMOF thin film membrane with a fluid composition containing at least $CO_2$ and $H_2$; and separating $CO_2$ from $H_2$. In an embodiment, the $H_2$ is substantially excluded from the ana-ZMOF thin film membrane.

Embodiments of the present disclosure further describe a method of separating chemical species comprising contacting an ana-ZMOF thin film membrane with a fluid composition containing at least n-butane and iso-butane; and separating n-butane from iso-butane. In an embodiment, the iso-butane is substantially excluded from the ana-ZMOF thin film membrane.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which:

FIGS. 7A-7B are SEM images of ana-ZMOF membrane after membrane testing, including cross-sectional images showing: (a) well intergrown crystals of ana-ZMOF on alumina substrate and (b) uniformity of membrane thickness, according to one or more embodiments of the present disclosure.

DETAILED DESCRIPTION

Embodiments of the present disclosure describe methods of fabricating thin film membranes comprising a continuous, defect-free thin film of a zeolite-like metal-organic framework with an ana topology (ana-ZMOF(s)) supported on a modified substrate. The methods described herein reflect an optimization of reaction conditions and proceed in two stages: (1) in the first stage the substrate is modified in-situ with an ana-ZMOF crystal precursors and (2) in the second stage a continuous, a defect-free ana-ZMOF thin film is intergrown on the modified substrate. Each of the first stage and the second stage typically proceed in the presence of polyvinylpyrrolidone. Surprisingly, the fabrication of thin film membranes in this way not only overcame the challenges associated with scale-up and pure crystal intergrowth, but also produced continuous, defect-free thin films of ana-ZMOFs, with intrinsic properties suitable for achieving highly challenging separations.

Accordingly, embodiments of the present disclosure further describe methods of hydrogen purification and butane isomers separations. For example, in one embodiment, the ana-ZMOF thin film membranes can be used in sorption-driven $CO_2/H_2$ separations. In another embodiment, the ana-ZMOF thin film membranes can be used in size-driven n-butane/iso-butane separations. The ana-ZMOF thin film membranes' preferential permeation of $CO_2$ over $H_2$ and of $C_4$ over $i-C_4$ outperform conventional microporous inorganic and polymer membranes. The ana-ZMOF thin film membranes are also among the most selective membranes for $CO_2/H_2$ and $C_4/i-C_4$ separations, with a $CO_2/H_2$ selectivity and $C_4/i-C_4$ selectivity of greater than 88 and 80, respectively.

Figure 1:
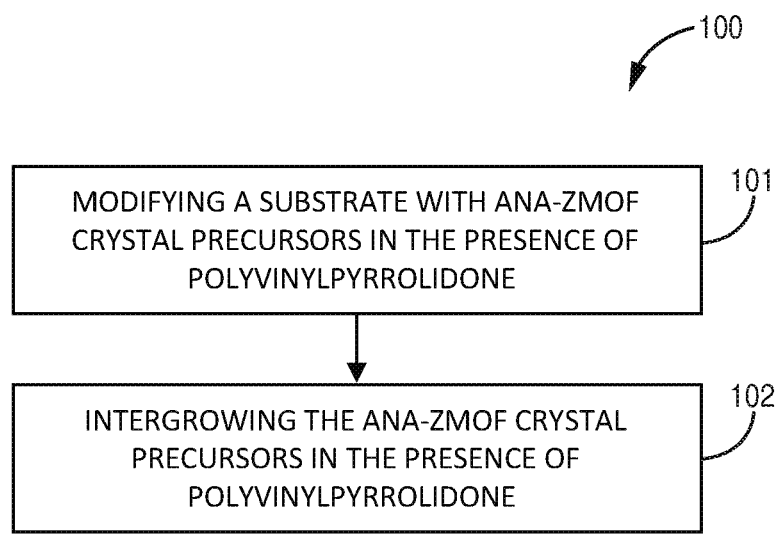
FIG. 1 is a flowchart of a method of fabricating a membrane with a thin film of a zeolite-like metal-organic framework with an ana topology, according to one or more embodiments of the present disclosure.

FIG. 1 is a flowchart of a method of fabricating an ana-ZMOF thin film membrane, according to one or more embodiments of the present disclosure. As shown, the method 100 can comprise (1) modifying a substrate with ana-ZMOF crystal precursors in the presence of polyvinylpyrrolidone; and (2) intergrowing the ana-ZMOF crystal precursors in the presence of polyvinylpyrrolidone to form a continuous defect-free thin film of an ana-ZMOF intergrown and/or supported on the substrate. In some embodiments, the steps (1) and (2) can be performed according to one or more of the steps 201, 202, 203, 204, 205, 206, and 207, all of which are discussed in greater detail below. For example, in some embodiments, step (1) is performed according to steps 201, 202, and 203; and step (2) is performed according to steps 205, 206, and 207; with step 204 being optional. Other combinations are possible and thus these shall not be limiting.

Figure 2:
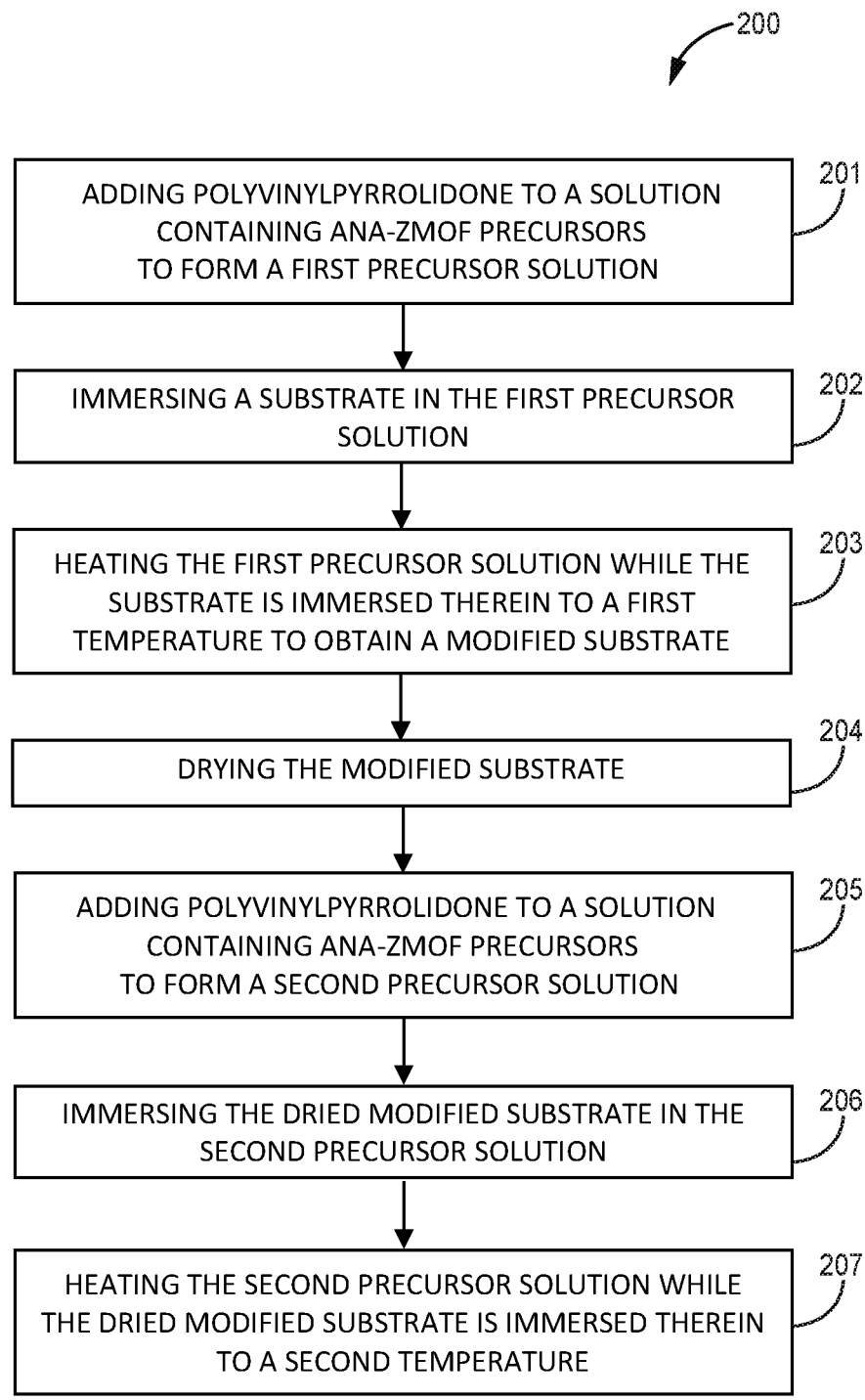
FIG. 2 is a flowchart of a method of fabricating a membrane with a thin film of a zeolite-like metal-organic framework with an ana topology, according to one or more embodiments of the present disclosure.

FIG. 2 is a flowchart of a method of fabricating an ana-ZMOF thin-film membrane, according to one or more embodiments of the present disclosure. The method 200 can comprise adding 201 polyvinylpyrrolidone to a first precursor solution containing ana-ZMOF precursors and one or more solvents; immersing 202 a substrate in the first precursor solution and heating 203 the first precursor solution while the substrate is immersed therein to a first temperature to obtain a modified substrate; optionally drying 204 the modified substrate; adding 205 polyvinylpyrrolidone to a second precursor solution containing ana-ZMOF precursors and one or more solvents; immersing 206 the dried modified substrate in the second precursor solution and heating 207 the second precursor solution while the dried modified substrate is immersed therein to a second temperature to form an ana-ZMOF thin film membrane.

At step 201, polyvinylpyrrolidone can be added to a solution containing ana-ZMOF precursors and optionally one or more solvents to prepare or form a first precursor solution. The first precursor solution can contain one or more of ana-ZMOF precursors, polyvinylpyrrolidone, and one or more solvents. To prepare the first precursor solution, one or more of the ana-ZMOF precursors, polyvinylpyrrolidone, and one or more solvents can be contacted (e.g., combined or placed) in, or added to, a reaction vessel. Upon being contacted or during the contacting, the ana-ZMOF precursors, polyvinylpyrrolidone, and/or one or more solvents can be dispersed or mixed by any suitable means. For example, in an embodiment, the first precursor solution can be sonicated to disperse the ana-ZMOF precursors or polyvinylpyrrolidone, or both, in the one or more solvents of the first precursor solution. Among other things, the sonicating can be used to prevent the formation of aggregates or agglomerates, or both, in the first precursor solution. While sonicating is a suitable technique for the methods described herein, other techniques can be used herein for dispersing, such as agitating, mixing, stirring, etc.

The ana-ZMOF precursors can include rare earth metal precursors. The rare earth metal precursors can include a rare earth element. For example, the rare earth metal precursors can include a rare earth element selected from the group consisting of cerium, dysprosium, erbium, europium, gadolinium, holmium, lanthanum, lutetium, neodymium, praseodymium, promethium, samarium, scandium, terbium, thulium, ytterbium, yttrium, and any combination thereof. The rare earth metal precursors can be present as salts of the rare earth elements. For example, the rare earth metal precursors can include trivalent cations of rare earth elements paired with trivalent anions. The rare earth metal precursors are typically hydrated, but they can also be anhydrides or anhydrous. The rare earth metal precursors are not particularly limited. Other forms and types of rare earth metal precursors will be readily appreciated by a skilled person.

The ana-ZMOF precursors can further include ligand precursors. The ligand precursors can include heterofunctional polytopic ligands. For example, the ligand precursors can ditopic or tetratopic ligands including carboxylate moieties and optionally one or more nitrogen heteroatoms. Examples of suitable ligand precursors include, but are not limited to, 4,5-imidazole dicarboxylic acid (ImDC); 1H-Imidazole-2-carboxylic acid; 2,7-diaza-anthracene-1,8-dicarboxylic acid; pyrimidine-4,6-dicarboxcylic acid; pyridine-2,5-dicarboxylic acid; 2,7-diaza-anthracene-3,6-dicarboxylic acid; benzene-1,2,4,5,tetracarboxylic acid; naphthalene-2,3,6,7-tetracarboxylic acid; anthracene-2,3,6,7-tetracarboxylic acid; or any combination thereof.

The ana-ZMOF precursors can further optionally comprise alkali metal precursors or alkaline metal precursors, or both alkali and alkaline metal precursors. The alkali metal precursors can be selected from the group consisting of lithium, sodium, potassium, rubidium, cesium, francium, and any combination thereof. The alkaline metal precursors can be selected form the group consisting of beryllium, magnesium, calcium, strontium, barium, radium, and any combination thereof.

The one or more solvents can be selected form the group consisting of water; N,N-dimethyl formamide (DMF); ethanol; 4,4;-trimethylene-dipiperidine; 1,2-diaminocyclohexane; and any combination thereof.

The in-situ modification of a substrate can be performed in one or both of the steps 202 and 203, among others. In those steps, a substrate can be immersed in the first precursor solution, and the first precursor solution can be heated while the substrate is immersed therein to a first temperature to obtain a modified substrate, or a substrate modified with ana-ZMOF crystal precursors. The substrate is typically completely immersed in the first precursor solution, although it can be partially immersed without departing from the scope of the invention of the present disclosure. One example of a suitable substrate that can be used herein is an alumina substrate, such as an $\alpha$-$Al_2O_3$ substrate. Other substrates known in the art can be used herein. The heating can proceed to the first temperature or it can proceed at the first temperature, optionally while stirring the first precursor solution. The first temperature and duration of the heating are typically selected to promote the formation of ana-ZMOF crystal precursors on the substrate.

In an embodiment, the first temperature can range from about 80° C. to about 180° C., or any range there within. For example, the first temperature can be about 80° C., about 85° C., about 90° C., about 95° C., about 100° C., about 105° C., about 110° C., about 115° C., about 120° C., about 125° C., about 130° C., about 135° C., about 140° C., about 145° C., about 150° C., about 155° C., about 160° C., about 165° C., about 170° C., or about 180° C. In an embodiment, the duration of the heating can range from about 30 min to about 5 h, or any range there within. For example, the duration of the heating can be about 30 min, about 1 h, about 1.5 h, about 2 h, about 2.5 h, about 3 h, about 3.5 h, about 4 h, about 4.5 h, or about 5. In one embodiment, the first precursor solution can be heated in an oil bath with stirring, while the substrate is immersed therein, to about 140° C. for about 1 hour.

The modified substrate is optionally dried in step 204. For example, the modified substrate can be removed from the first precursor solution and allowed to dry. The manner in which the modified substrate is allowed to dry is not particularly limited. Any technique suitable for drying the modified substrate may be used herein. In an embodiment, the modified substrate can be dried by removing it from the first precursor solution and allowing the modified substrate to dry in air.

At step 205, polyvinylpyrrolidone can be added to a solution containing ana-ZMOF precursors and optionally one or more solvents to prepare or form a second precursor solution. The second precursor solution can contain one or more of the ana-ZMOF precursors, polyvinylpyrrolidone, and one or more solvents. For example, in some embodiments, the step 205 includes adding polyvinylpyrrolidone to a second precursor solution containing ana-ZMOF precursors. To prepare the second precursor solution, one or more of the ana-ZMOF precursors, polyvinylpyrrolidone, and one or more solvents can be contacted (e.g., combined or placed) in, or added to, a reaction vessel. Upon being contacted or during the contacting, the ana-ZMOF precursors, polyvinylpyrrolidone, and/or one or more solvents can be dispersed or mixed by any suitable means. For example, in an embodiment, the second precursor solution can be sonicated to disperse the ana-ZMOF precursors or polyvinylpyrrolidone, or both, in the one or more solvents of the second precursor solution. After the dispersing or mixing, the second precursor solution can be heated, while optionally stirring, to or at a third temperature. The third temperature can be the same as the first temperature or it can be a different temperature. The heating typically proceeds until the second precursor solution is visibly clear or until the ana-ZMOF precursors and polyvinylpyrrolidone are dissolved in the one or more solvents.

In an embodiment, the third temperature can range from about 80° C. to about 180° C., or any range there within. For example, the third temperature can be about 80° C., about 85° C., about 90° C., about 95° C., about 100° C., about 105° C., about 110° C., about 115° C., about 120° C., about 125° C., about 130° C., about 135° C., about 140° C., about 145° C., about 150° C., about 155° C., about 160° C., about 165° C., about 170° C., or about 180° C. In an embodiment, the duration of the heating can range from about 30 min to about 5 h, or any range there within. For example, the duration of the heating can be about 30 min, about 1 h, about 1.5 h, about 2 h, about 2.5 h, about 3 h, about 3.5 h, about 4 h, about 4.5 h, or about 5. In one embodiment, the second precursor solution can be heated with stirring to about 140° C. for about 1 hour.

In one or more aspects of the invention, the first precursor solution and the second precursor solution each include the same precursor species, wherein the precursor species are selected from the group consisting of the ana-ZMOF precursors, polyvinylpyrrolidone, solvents, and combinations thereof. For example, in an embodiment, the first precursor solution and the second precursor solution each include the same precursor species, wherein the precursors species are selected from the group consisting of rare earth metal precursors, ligand precursors, alkali metal precursors, alkaline metal precursors, solvents, and combinations thereof. In another aspect of the invention, the first precursor solution and the second precursor solution include at least one different precursor species, wherein the precursor species are selected from the group consisting of the ana-ZMOF precursors, polyvinylpyrrolidone, solvents, and combinations thereof. For example, in an embodiment, the first precursor solution and the second precursor solution include at least one different precursor species selected from the group consisting of rare earth metal precursors, ligand precursors, alkali metal precursors, alkaline metal precursors, solvents, and combinations thereof.

In one or more aspects of the invention, the concentration or amount (e.g., mass, volume, etc.) of the precursor species in the first precursor solution and the second precursor solution are different. For example, in an embodiment, the concentration or amount of one or more of the rare earth metal precursors, ligand precursors, alkali metal precursors, alkaline metal precursors, and solvents in the first precursor solution is different from the second precursor solution. The second precursor solution can typically include a greater concentration or amount of precursor species than the first precursor solution, but other variations can be used without departing from the scope of the invention of the present disclosure. In another aspect of the invention, the concentration or amount of the precursor species in the first precursor solution and the second precursor solution are the same. For example, in an embodiment, the concentration or amount of the rare earth metal precursors, ligand precursors, alkali metal precursors, alkaline metal precursors, and solvents in the first precursor solution and the second precursor solution are the same.

The ana-ZMOF thin film membrane can be formed in one or both of the steps 206 and 207, among others. In those steps, the dried modified substrate can be immersed in the second precursor solution, and the second precursor solution can be heated while the dried modified substrate is immersed therein to a second temperature. The dried modified substrate is typically completely immersed in the second precursor solution, although it can be partially immersed without departing from the scope of the invention of the present disclosure. The heating can proceed to the second temperature or it can proceed at the second temperature, usually without stirring, but optionally with stirring. The second temperature and duration of the heating should be sufficient to achieve growth or intergrowth of the ana-ZMOF thin film on the substrate. Following the heating, the reaction vessel containing the second precursor solution and thin film membrane can be allowed to cool to about room temperature. The thin film membrane can then be washed one or more times with, for example, DMF or ethanol, or both DMF and ethanol.

In an embodiment, the second temperature can range from about 50° C. to about 150° C., or any range there within. For example, the third temperature can be about 50° C., about 55° C., about 60° C., about 65° C., about 70° C., about 75° C., about 80° C., about 85° C., about 90° C., about 95° C., about 100° C., about 105° C., about 110° C., about 115° C., about 120° C., about 125° C., about 130° C., about 135° C., about 140° C., about 145° C., or about 150° C. In an embodiment, the duration of the heating can range from about 1 day to about 10 days, or any range therewith. For example, the duration of the heating can be about 1 day, about 2 days, about 3 days, about 4 days, about 5 days, about 6 days, about 7 days, about 8 days, about 9 days, or about 10 days. In one embodiment, the second precursor solution can be heated in an oven while the dried modified substrate is immersed therein to about 130° C. for about 3 days.

The ana-ZMOF thin film membrane can optionally be activated in step 208 (not shown). For example, in an embodiment, the ana-ZMOF thin film membrane can be activated by solvent exchange, drying the solvent-exchanged membrane, subjecting the dried solvent-exchanged membrane to vacuum or inert flow (e.g., helium), or any combination thereof. The solvent for solvent exchange can depend on the solvents used for the fabrication of the ana-ZMOF thin film membrane. A skilled person can readily select solvents suitable for solvent exchange, as well as inert gases suitable for activating the ana-ZMOF thin film membrane.

In an embodiment, the method of fabricating an ana-ZMOF thin film membrane comprises preparing a first solution containing $Y(NO_3)_3 \cdot 6H_2O$, 4,5-imidazoledicarboxylic acid, and KCl in water and DMF; immersing an alumina substrate in the first precursor solution and heating the first precursor solution while the alumina substrate is immersed therein to about 140° C. to obtain a modified substrate; drying the modified substrate; preparing a second precursor solution containing $Y(NO_3)_3 \cdot 6H_2O$, 4,5-imidazoledicarboxylic acid, and KCl in water and DMF; and immersed the dried modified substrate in the second precursor solution and heating the second precursor solution while the dried modified substrate is immersed therein to about 130° C. to form an ana-ZMOF thin film membrane.

Embodiments of the present disclosure further describe ana-ZMOF thin film membranes, such as the ana-ZMOF thin film membranes fabricated according to the methods of the present disclosure. The ana-ZMOF thin film membranes can comprise a continuous, defect-free thin film of an ana-ZMOF intergrown or supported on a substrate or a modified substrate. In an embodiment, the ana-ZMOF thin films exhibit a pore window size of about 4.1 Å. In an embodiment, the ana-ZMOF thin films exhibit a $CO_2/H_2$ selectivity of 88 or greater. In an embodiment, the ana-ZMOF thin films exhibit a $C_4/i-C_4$ selectivity of 80 or greater. In an embodiment, the ana-ZMOF thin film membranes exhibit a heat of adsorption for $CO_2$ of about 40 kJ/mol. The ana-ZMOF thin film membranes can be used for sorption-driven $CO_2/H_2$ separations and/or for size-driven n-butane/iso-butane separations.

Figure 3:
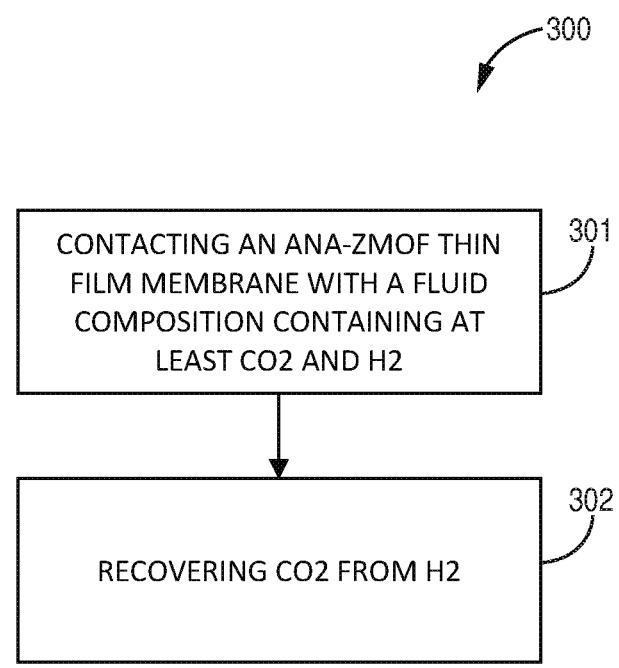
FIG. 3 is a flowchart of a method of separating $CO_2$ from a fluid composition containing at least $CO_2$ and $H_2$, according to one or more embodiments of the present disclosure.

FIG. 3 is a flowchart of a method of separating $CO_2$ from a fluid composition containing at least $CO_2$ and $H_2$, according to one or more embodiments of the present disclosure. The method 300 can comprise contacting 301 an ana-ZMOF thin film membrane with a fluid composition containing at least $CO_2$ and $H_2$ and separating 302 $CO_2$ from $H_2$.

The ana-ZMOF thin film membrane is contacted with a fluid composition in step 301. The contacting can proceed by bringing the ana-ZMOF thin film membrane and fluid composition into physical contact, or immediate or close proximity. The contacting can proceed under any of a variety of conditions, depending on, for example, the source of the fluid composition. For example, in an embodiment, the contacting can proceed at a temperature ranging from about 20° C. to about 35° C. The fluid composition can be provided in any phase, such as a gas/vapor phase, liquid phase, or a combination thereof. The fluid composition typically includes at least $CO_2$ and $H_2$, but it can optionally include other species and impurities. For example, in an embodiment, the fluid composition can include hydrogen, carbon dioxide, and impurities and/or byproducts resulting from a water gas shift reaction between syngas and water vapor.

The $CO_2$ is separated from $H_2$ in step 302. The separation can proceed as a sorption-driven separation using the ana-ZMOF thin film membrane as a reverse-selective membrane in which the $CO_2$ sorbs onto the membrane or its pores and/or permeates through the membrane to the exclusion or substantial exclusion of $H_2$. The hydrogen recovered from the separation can be highly purified. For example, in an embodiment, the hydrogen can be recovered at 99.9% purity or greater, such as about 99.9% purity, 99.95% purity, 99.97% purity, 99.995% purity, 99.999% purity, or greater. Lower purity levels of hydrogen can also be achieved, such as 80% purity or greater, without departing from the scope of the invention of the present disclosure.

Figure 4:
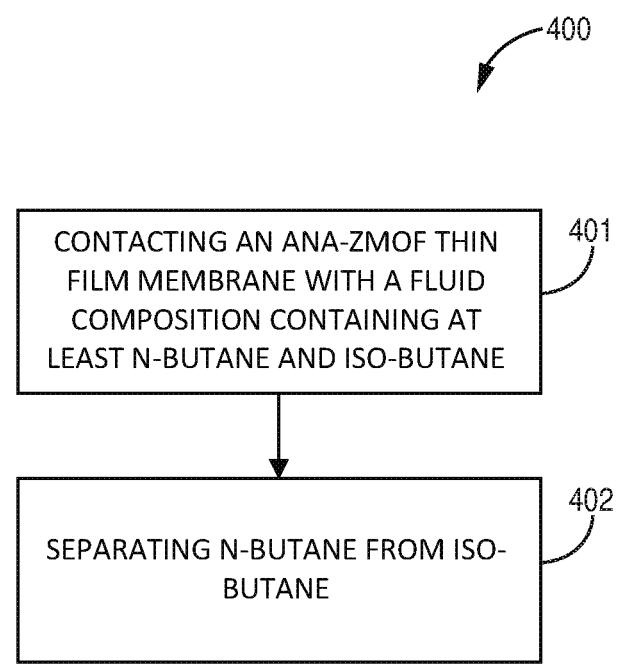
FIG. 4 is a flowchart of a method of separating n-butane from a fluid composition containing at least n-butane and iso-butane, according to one or more embodiments of the present disclosure.

FIG. 4 is a flowchart of a method of separating n-butane from a fluid composition containing at least n-butane and iso-butane, according to one or more embodiments of the present disclosure. The method 400 can comprise contacting 401 an ana-ZMOF thin film membrane with a fluid composition containing at least n-butane and iso-butane and separating 402 n-butane from iso-butane.

The ana-ZMOF thin film membrane is contacted with the fluid composition in step 401. The contacting can proceed by bringing the ana-ZMOF thin film membrane and fluid composition into physical contact, or immediate or close proximity. The contacting can proceed under any of a variety of conditions, depending on, for example, the source of the fluid composition. For example, in an embodiment, the contacting can proceed at a temperature ranging from about 20° C. to about 200° C. The fluid composition can be provided in any phase, such as a gas/vapor phase, liquid phase, or a combination thereof. The fluid composition typically includes a mixture of butane isomers, such as n-butane and iso-butane, but it can optionally include other species and impurities.

The n-butane is separated from iso-butane in step 402. The separation can proceed as a size-drive separation using the ana-ZMOF thin film membrane as a molecular sieve in which the n-butane permeates through the membrane to the exclusion or substantial exclusion of iso-butane. In other words, the ana-ZMOF thin film membrane can kinetically separate the n-butane from the iso-butane based on size. The butane recovered from the separation can be highly purified. For example, the butane can be recovered at 99% purity or greater, such as about 99.9% purity, 99.95% purity, 99.97% purity, 99.995% purity, 99.999% purity, or greater.

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

EXAMPLE 1

Figure 5:
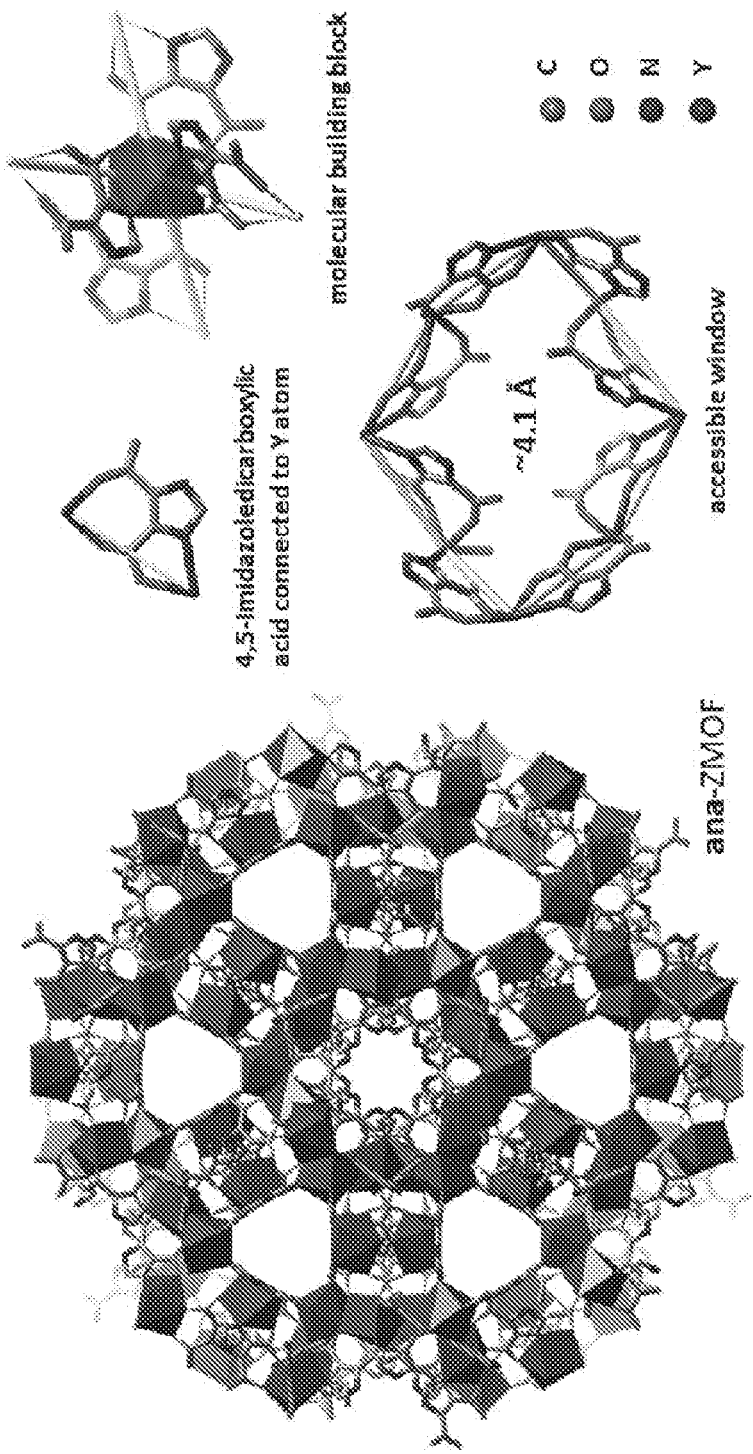
FIG. 5 is a schematic diagram showing the structure and pore window size of ana-ZMOF, made from molecular building blocks constructed from 4,5-imidazoledicarboxylic acid and Y atom (potassium and solvent molecules are not shown in the pores for clarity), according to one or more embodiments of the present disclosure.
Figures 6A, 6B:
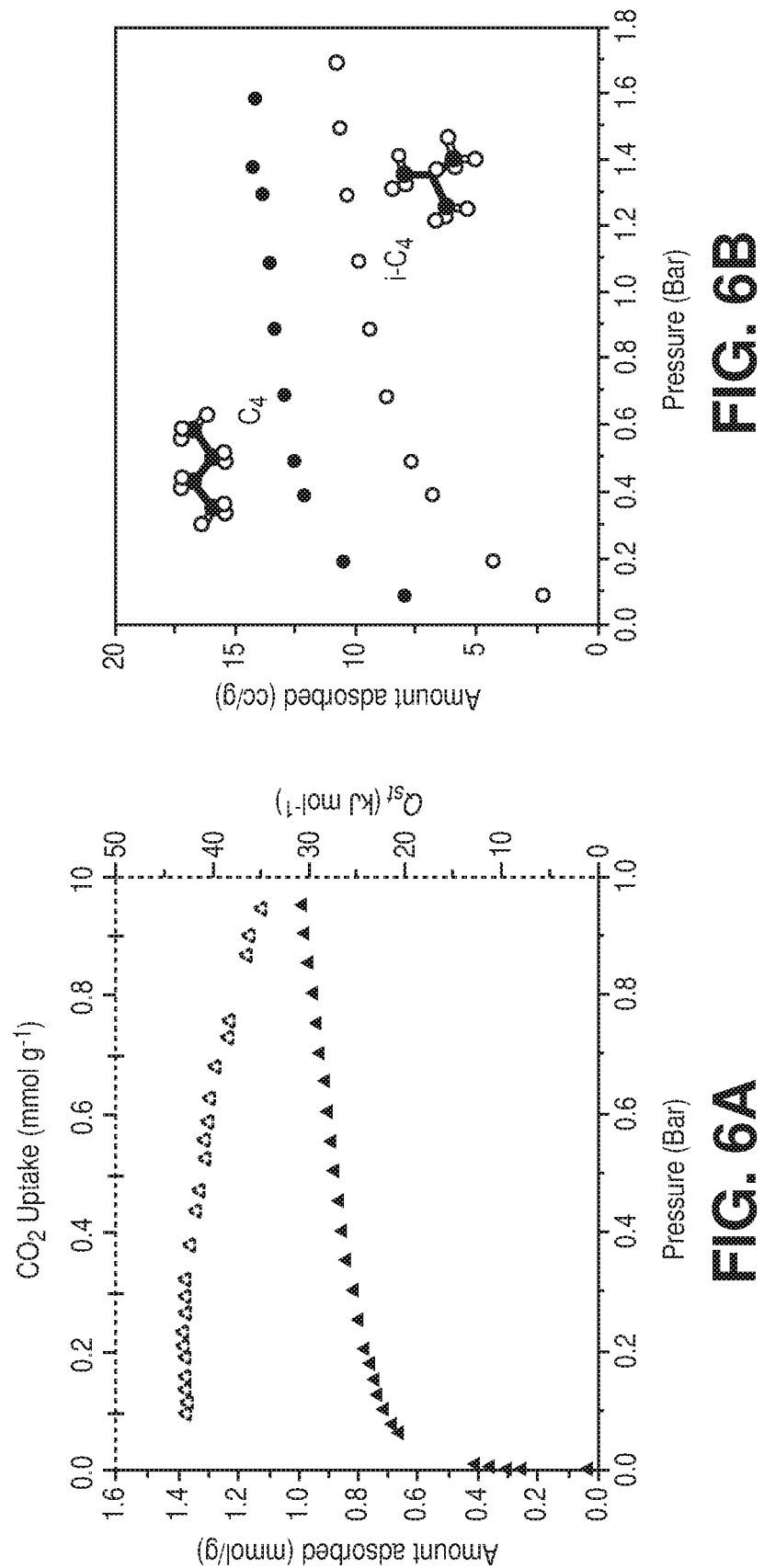
FIGS. 6A-6B show graphical views of (a) ana-ZMOF $CO_2$ sorption uptake at 298 K and $CO_2$ heat of adsorption and (b) ana-ZMOF butane and isobutane sorption uptake at 308 K, according to one or more embodiments of the present disclosure.

The present Example describes a novel methodology for fabricating a continuous, defect-free ana-ZMOF membrane with unique intrinsic properties suitable for achieving highly challenging separations, such as $CO_2/H_2$ separations and separations of butane isomers, such as n-$C_4$/i-$C_4$ separations, among others. The ana-ZMOF membranes favorably exhibited a high affinity for $CO_2$ and a small aperture size. The pore window size of the ana-ZMOF was one to three times bigger than a $CO_2$ molecule and thus limited the diffusion of hydrogen. In particular, the pore window size estimated from the crystallography to be around 4.1 Å (FIG. 5) and heat of adsorption for $CO_2$ was estimated to be about 40 kJ/mol (FIG. 6A). As shown in FIG. 6B, the ana-ZMOF material was used in sorption-based separations and demonstrated an ability to kinetically separate paraffins and isoparaffins by size. The advantages afforded by the unique intrinsic properties of the ana-ZMOF have wide applicability for sorption-based separations and kinetically-based separations.

The ana-ZMOF membranes described herein address the problem of advancing materials for membranes used in $CO_2/H_2$ and $C_4/i-C_4$ separations. The unique property of ana-ZMOF sorption-driven $CO_2/H_2$ separation and size-driven $C_4/i-C_4$ separation reduced the surface modules of the membrane by using a highly $CO_2$ selective membrane and butane selective membrane. The addition of polyvinylpyrrolidone in the fabrication of the ana-ZMOF membranes was a breakthrough that addressed the problems of membrane scale-up, among other things. The measured $CO_2/H_2$ and nC$_4$/iC$_4$ selectivity for this pure ana-ZMOF membrane was over 88 and 80, respectively, which makes the ana-ZMOF membranes one of the most selective membranes for CO$_2$/H$_2$ and butane isomers separation. Therefore the nC$_4$/iC$_4$ selectivity observed in these fabricated ana-ZMOF membrane was much higher than the reported polymeric membranes and other mixed-matrix materials (MMMs). These MOF membranes combine easy-fabrication with high-performance for practical applications of CO$_2$/H$_2$ and butane isomers separations.

The methodology described herein overcame numerous challenges associated with pure crystal intergrowth and conventional fabrication techniques. As described herein, pure crystal intergrowth was achieved by the addition of polyvinylpyrrolidone to the reaction mixture and a novel two-step synthetic procedure was optimized. The ana-ZMOF was fabricated as a thin film on alumina support using this newly developed two-step procedure. In the first step, the fabrication proceeded with the in-situ modification of the support with the ana-ZMOF crystal precursors. In a typical procedure, a stirrer bar and 20 mm in diameter α-Al$_2$O$_3$ substrate were placed on a bottom of a 60 mL scintillation vial (without contact), then a well-dispersed by sonication reaction mixture containing Y(NO$_3$)$_3$.6H$_2$O (about 0.05 mmol, about 19.2 mg), 4,5-imidazoledicarboxylic acid (about 0.1 mmol, about 15.6 mg), KCl (about 0.05 mmol, about 3.7 mg), Polyvinylpyrrolidone (about 0.5 mL 20 wt % solution in DMF), water (about 0.1 mL), DMF (about 6 mL) was added. The vial was sealed with aluminium foil and cup. The vial was then placed in an oil bath and heated with stirring to about 140° C. for about 1 hour. After one-hour, the hot vial was opened and substrate was quickly removed and dried in air under the fume hood. In the second step, the well-dispersed by sonication reaction mixture containing Y(NO$_3$)$_3$.6H$_2$O (about 0.2 mmol, about 76.8 mg), 4,5-imidazoledicarboxylic acid (about 0.4 mmol, about 62.4 mg), KCl (about 0.2 mmol, about 14.8 mg), Polyvinylpyrrolidone (about 0.5 mL 20 wt % solution in DMF), water (about 0.2 mL), and DMF (about 7 mL) was placed in an oil bath and heated with stirring to about 140° C. until the solution became clear. After about 20 min, when all reagents had dissolved, the stirrer bar was removed and the dried modified α-Al$_2$O$_3$ substrate from the first step was placed inside the vial, which was then sealed with aluminium foil and cap. The reaction mixture was placed in about 130° C. oven. After 5 days, the vial was allowed to cool down to about room temperature and the substrate was removed and washed with DMF and ethanol. For membrane activation, the remaining DMF in membrane was exchanged with ethanol, by placing the membrane in fresh solvent 2-3 times a day for 3 days. The solvent-exchanged membrane was dried in air at room temperature, and further activation was carried out in a permeation cell with vacuum or helium flow. The SEM images of a typical ana-ZMOF membrane are depicted in FIGS. 7A-7B, which show the continuity of the ana-ZMOF membrane closed thin film.

Figure 8B:
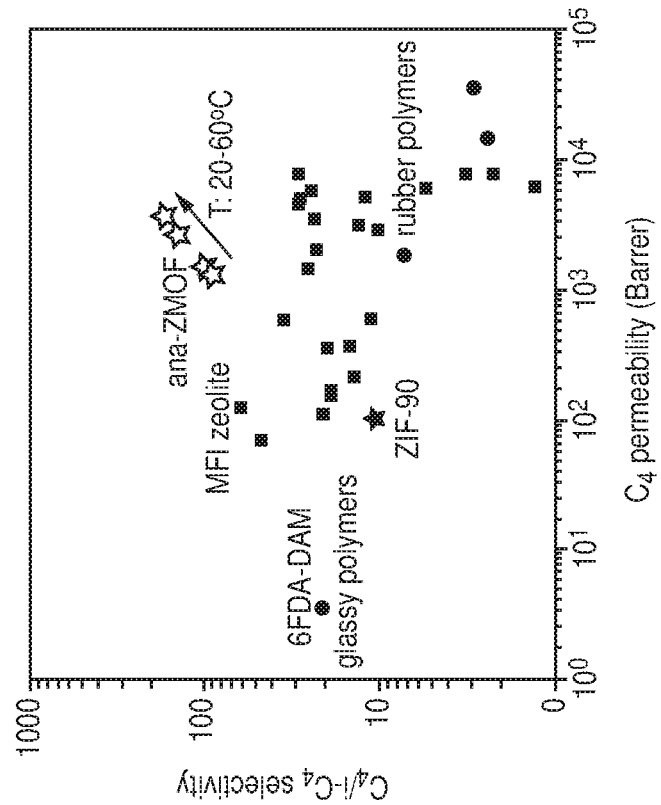
FIGS. 8A-8B are graphical views showing a comparison of the best-performing membranes reported in literature with the ana-ZMOF membrane of the present disclosure, where (a) shows $CO_2/H_2$ separation at 20-35° C. and (b) shows $C_4/i-C_4$ separation at 20-200° C., according to one or more embodiments of the present disclosure.
Figure 8A:
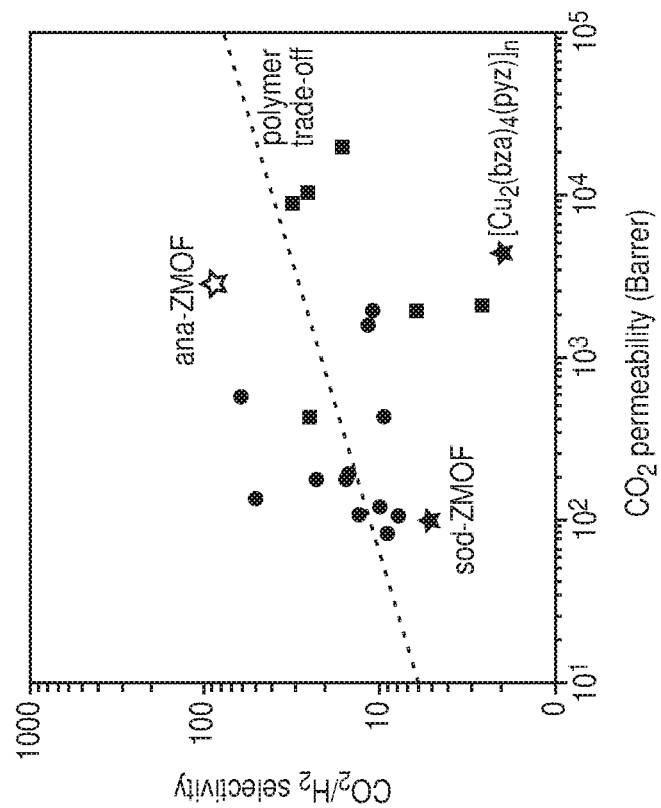

The separation performance of the prepared ana-ZMOF membrane was assessed by permeations of pure and mixture gases of CO$_2$, H$_2$ and n-butane and iso-butane under about 1.4 bar at about 35° C. FIGS. 8A-8B provide a summary in graphical form of typical permeation results of the ana-ZMOF membrane and provides a comparison to benchmark performing materials in the literature. The ana-ZMOF membranes showed preferential permeation of CO$_2$ over H$_2$, and C$_4$/i-C$_4$, over-performing microporous inorganic and polymer membranes reported in literature. Thus, ana-ZMOF membrane, featuring easy-fabrication and high-performance, have demonstrated utility for practical applications in two challenging separation fields.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A method of fabricating a zeolite-like metal-organic framework with an ana-topology (ana-ZMOF) thin film membrane, the method comprising:
   (1) modifying a substrate with ana-ZMOF crystal precursors in the presence of polyvinylpyrrolidone; and
   (2) intergrowing the ana-ZMOF crystal precursors in the presence of polyvinylpyrrolidone to form a continuous defect-free thin film of an ana-ZMOF intergrown on the substrate.

2. The method of claim 1, wherein the ana-ZMOF precursors include a rare earth metal precursor, a ligand precursor, and an alkali metal precursor or an alkaline metal precursor.

3. The method of claim 2, wherein the rare-earth metal precursors include a rare earth element selected from the group consisting of cerium, dysprosium, erbium, europium, gadolinium, holmium, lanthanum, lutetium, neodymium, praseodymium, promethium, samarium, scandium, terbium, thulium, ytterbium, yttrium, and any combination thereof.

4. The method of claim 2, wherein the ligand precursor is selected from the group consisting of 4,5-imidazole dicarboxylic acid (ImDC); 1H-Imidazole-2-carboxylic acid; 2,7-diaza-antracene-1,8-dicarboxylic acid; pyrimidine-4,6-dicarboxcylic acid; pyridine-2,5-dicarboxylic acid; 2,7-diaza-anthracene-3,6-di carb oxylic acid; benzene-1,2,4,5, tetracarboxylic acid; naphthalene-2,3,6,7-tetracarboxylic acid; anthracene-2,3,6,7-tetracarboxylic acid; and any combination thereof.

5. The method of claim 2, wherein the alkali metal precursor includes an alkali metal selected from the group consisting of lithium, sodium, potassium, rubidium, cesium, francium, and any combination thereof.

6. The method of claim 2, wherein the alkaline metal precursor includes an alkaline metal selected from the group consisting of beryllium, magnesium, calcium, strontium, barium, radium, and any combination thereof.

7. The method of claim 1, wherein the continuous ana-ZMOF thin film membrane comprises a continuous thin film of ana-ZMOF inter-grown on the modified substrate.

8. A membrane comprising a thin film of a continuous zeolite-like metal-organic framework having an ana topology (ana-ZMOF) intergrown on a substrate, wherein the ana-ZMOF thin film membrane exhibits a selectivity for $CO_2$ over $H_2$ and n-butane over iso-butane, and wherein the thin film is intergrown on the substrate using polyvinylpyrrolidone.

9. A method of separating chemical species, comprising:
contacting an ana-ZMOF thin film membrane with a fluid composition containing at least $CO_2$ and $H_2$; and
separating $CO_2$ from $H_2$,
wherein the ana-ZMOF thin film membrane includes an ana-ZMOF thin film intergrown on a substrate using polyvinylpyrrolidone.

10. The method of claim 9, wherein $H_2$ is substantially excluded from the ana-ZMOF thin film membrane.

11. A method of separating chemical species, comprising:
contacting an ana-ZMOF thin film membrane with a fluid composition containing at least n-butane and iso-butane; and
separating n-butane from iso-butane,
wherein the ana-ZMOF thin film membrane includes an ana-ZMOF thin film intergrown on a substrate using polyvinylpyrrolidone.

12. The method of claim 11, wherein iso-butane is substantially excluded from the ana-ZMOF thin film membrane.

13. A method of fabricating a membrane with a thin film of a zeolite-like metal-organic framework with an ana topology, the method comprising:
(a) adding polyvinylpyrrolidone to a solution containing ana-ZMOF precursors and optionally one or more solvents to prepare a first precursor solution;
(b) immersing a substrate in the first precursor solution;
(c) heating the first precursor solution while the substrate is immersed therein to a first temperature sufficient to form a modified substrate;
(d) drying the modified substrate;
(e) adding polyvinylpyrrolidone to a solution containing ana-ZMOF precursors and optionally one or more solvents to prepare a second precursor solution;
(f) immersing the dried modified substrate in the second precursor solution; and
(g) heating the second precursor solution while the dried modified substrate is immersed therein to a second temperature sufficient to form an ana-ZMOF thin film membrane.

14. The membrane of claim 8, wherein the membrane has a pore window size of 4.1 Å.

15. The method of claim 9, wherein the thin film membrane has a pore window size of 4.1 Å.

16. The method of claim 11, wherein the thin film membrane has a pore window size of 4.1 Å.

17. The method of claim 13, wherein the first precursor solution is sonicated prior to immersing the substrate in the first precursor solution.

18. The method of claim 13, wherein the second precursor solution is sonicated and heated prior to immersing the dried modified substrate in the second precursor solution.

19. The method of claim 13, wherein the one or more solvents are selected from the group consisting of water; N,N-dimethyl formamide (DMF); ethanol; 4,4;-trimethylene-dipiperidine; 1,2-diaminocyclohexane; and any combination thereof.

* * * * *